UNITED STATES PATENT OFFICE.

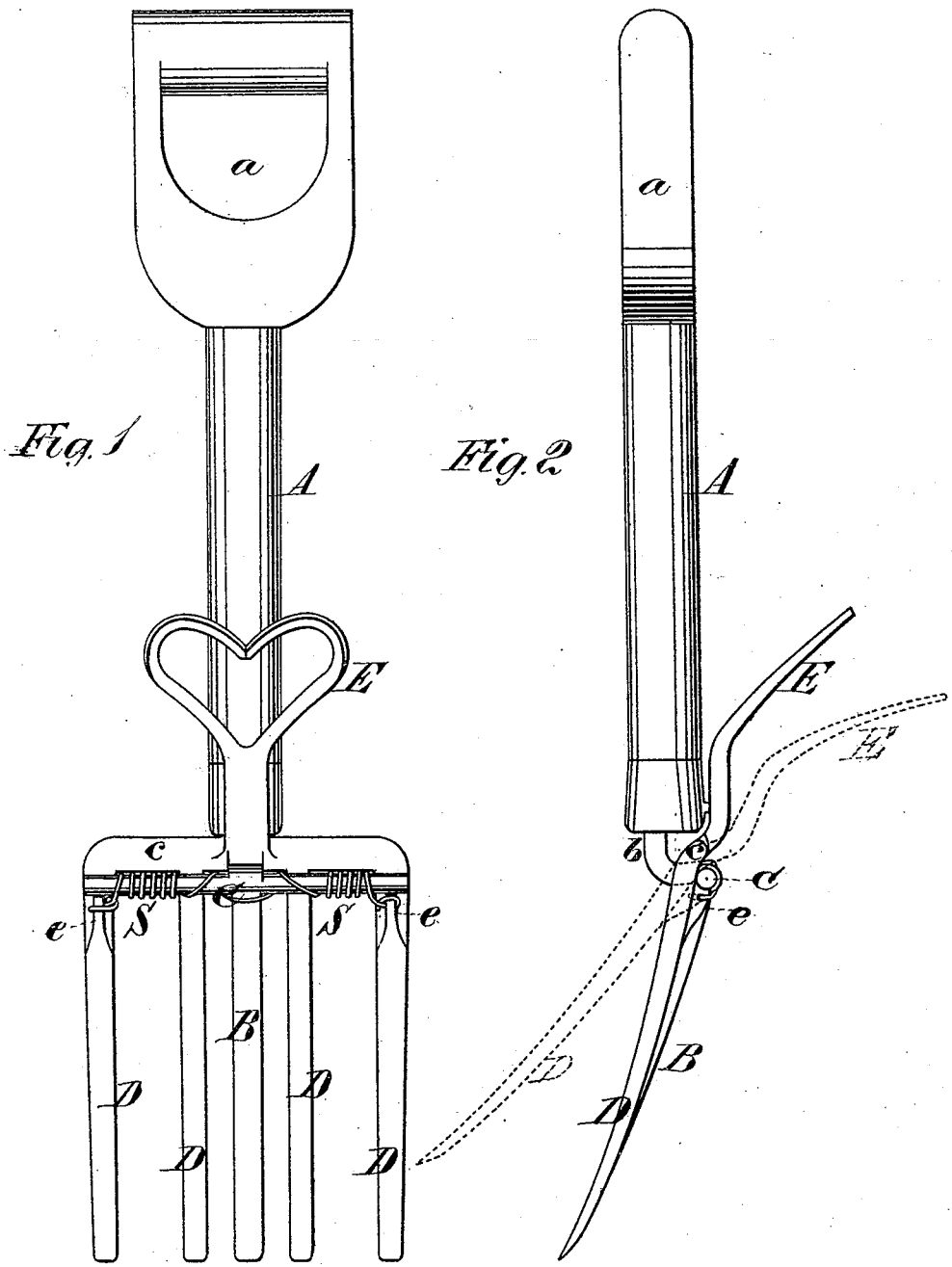

REUBEN W. TRUSSELL, OF BURR OAK, MICHIGAN.

IMPROVEMENT IN POTATO-FORKS.

Specification forming part of Letters Patent No. 175,528, dated March 28, 1876; application filed February 12, 1876.

*To all whom it may concern:*

Be it known that I, REUBEN W. TRUSSELL, of Burr Oak, in the county of St. Joseph and State of Michigan, have invented a new and valuable Improvement in Potato-Forks; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a plan view of my fork, and Fig. 2 is a side view of the same.

This invention has relation to hand-forks, which are designed for digging potatoes and other roots; and the nature of my invention consists in a tooth or finger, which is rigidly fixed into the handle of the implement, and constructed with a cross-head near its upper part, in combination with an excavating-fork on which a treadle is formed, and a coiled spring connection, as will be hereinafter explained.

In the annexed drawings, A designates a staff on the upper end of which a handle, *a*, is formed. Into the lower end of the staff is rigidly secured the tang *b* of a finger or tine, B, which tang and finger are formed on a round cross-head, C, at the middle of the length thereof. D D designate the tines of a fork, which are formed on or suitably secured to a head, *c*, from which extends a foot-piece or treadle, E, formed substantially as shown. At the ends of the fork are shoulders *e*, which are concave and perforated, as shown, and on which bear the ends of the cross-head C of the finger or tine B. The head C is held in place on its shoulders *e* by means of the ends of the springs S, which springs are coiled around the head and its tine, and the ends passed through the raised portions, forming the shoulders *e*. The springs operate to hold the contracted portion of the treadle E against the ferrule on the staff A, as shown in Fig. 2, in full lines, in which position all the tines are forced into the earth the proper depth. The handle is then drawn back a little, and with the foot upon the treadle E, the tines D are thrown up, carrying with them the potatoes, and leaving the earth behind. The springs S return the tines to a position for insertion into the ground again.

What I claim as new, and desire to secure by Letters Patent, is—

1. The combination, in a potato-excavator, of the tine B, rigidly secured to the staff A and formed on a cross-head, C, the fork D, and its treadle E, connected to the cross-head C by means of shoulders *e* and coiled springs S, substantially as described.

2. The fork D, provided with the treadle E and perforated shoulders *e*, in combination with the tine B, having the cross-head C at right angles thereto, shank *b* for attachment to the handle, and spring S, substantially as set forth.

In testimony that I claim the above I have hereunto subscribed my name in the presence of two witnesses.

REUBEN W. TRUSSELL.

Witnesses:
 A. B. MILLS,
 B. N. STONE.